United States Patent
Lehmann et al.

(10) Patent No.: US 8,530,533 B2
(45) Date of Patent: Sep. 10, 2013

(54) WATER-BLOWN RIGID FOAMS FOR THE INSULATION OF LIQUEFIED NATURAL GAS TANKS

(75) Inventors: Pit Lehmann, Antwerp (BE); Katrin Thane, Bad Essen (DE); Cheul Hyeon Hwang, Daejeon (KR)

(73) Assignee: BASF SE, Ludwigshafen (DE)

( * ) Notice: Subject to any disclaimer, the term of this patent is extended or adjusted under 35 U.S.C. 154(b) by 512 days.

(21) Appl. No.: 12/522,479

(22) PCT Filed: Jan. 2, 2008

(86) PCT No.: PCT/EP2008/050001
§ 371 (c)(1),
(2), (4) Date: Jul. 8, 2009

(87) PCT Pub. No.: WO2008/083996
PCT Pub. Date: Jul. 17, 2008

(65) Prior Publication Data
US 2010/0041782 A1 Feb. 18, 2010

(30) Foreign Application Priority Data
Jan. 9, 2007 (EP) .................................... 07100285

(51) Int. Cl.
*C08G 18/28* (2006.01)
(52) U.S. Cl.
USPC ............. 521/99; 521/128; 521/129; 521/130; 521/131; 521/173; 521/174; 264/45.1; 428/423.1
(58) Field of Classification Search
USPC .................. 521/128, 129, 130, 131, 173, 174, 521/99; 264/45.1; 428/423.1
See application file for complete search history.

(56) References Cited

U.S. PATENT DOCUMENTS

| | | | |
|---|---|---|---|
| 3,319,431 A | | 5/1967 | Clarke et al. |
| 3,341,050 A | | 9/1967 | Forman et al. |
| 5,290,823 A | * | 3/1994 | Volkert .......................... 521/131 |
| 5,478,494 A | | 12/1995 | Lee et al. |
| 5,690,855 A | | 11/1997 | Nichols et al. |
| 5,770,635 A | | 6/1998 | Lee et al. |
| 5,798,533 A | * | 8/1998 | Fishback et al. ......... 252/182.25 |
| 2004/0198851 A1 | * | 10/2004 | Becker et al. .................... 521/53 |
| 2005/0115248 A1 | | 6/2005 | Koehler et al. |
| 2007/0015842 A1 | | 1/2007 | Moerman et al. |
| 2008/0188582 A1 | | 8/2008 | Lehmann et al. |
| 2008/0234402 A1 | | 9/2008 | Lehmann et al. |

FOREIGN PATENT DOCUMENTS

| | | |
|---|---|---|
| EP | 1 698 649 | 9/2006 |
| JP | 2001 150558 | 6/2001 |
| JP | 2003 240198 | 8/2003 |
| KR | 2000 0010021 | 2/2000 |
| KR | 2000 0010022 | 2/2000 |

* cited by examiner

*Primary Examiner* — John Cooney
(74) *Attorney, Agent, or Firm* — Oblon, Spivak, McClelland, Maier & Neustadt, L.L.P.

(57) ABSTRACT

The present invention relates to a rigid polyurethane foam comprising reinforcing materials which can be obtained by mixing (a) isocyanates which have a viscosity at 25° C. of less than 500 mPas with (b) compounds having groups which are reactive toward isocyanates, (c) blowing agents comprising water, (d) catalysts and, if appropriate, (e) further additives to form a reaction mixture and applying the reaction mixture to a reinforcing material, wherein the compounds (b) having groups which are reactive toward isocyanates comprise a polyetherol (b1) having a functionality of 4 or more and a viscosity at 25° C. of 10 000 mPas or less and a polyetherol (b2) having a functionality of 3 or less and a viscosity at 25° C. of 500 mPas or less. The present invention further relates to a process for producing such rigid polyurethane foams and the use of the rigid polyurethane foams for the insulation of liquefied natural gas tanks.

20 Claims, No Drawings

WATER-BLOWN RIGID FOAMS FOR THE INSULATION OF LIQUEFIED NATURAL GAS TANKS

The present invention relates to a rigid polyurethane foam comprising reinforcing materials which can be obtained by mixing (a) isocyanates which have a viscosity at 25° C. of less than 500 mPas with (b) compounds having groups which are reactive toward isocyanates, (c) blowing agents comprising water, (d) catalysts and, if appropriate, (e) further additives to form a reaction mixture and applying the reaction mixture to a reinforcing material, wherein the compounds (b) having groups which are reactive toward isocyanates comprise a polyetherol (b1) having a functionality of 4 or more and a viscosity at 25° C. of 10 000 mPas or less and a polyetherol (b2) having a functionality of 3 or less and a viscosity at 25° C. of 500 mPas or less. The present invention further relates to a process for producing such rigid polyurethane foams and the use of the rigid polyurethane foams for the insulation of liquefied natural gas tanks.

Further embodiments of the present invention may be found in the claims, the description and the examples. It goes without saying that the features mentioned above and those still to be explained below of the subject matter of the invention can be used not only in the combination indicated in each case but also in other combinations without going outside the scope of the invention.

Apart from petroleum, natural gas is one of the most important energy sources of our time. However, to deliver the gas from the sources to the customer, it usually has to be transported over great distances. This occurs, for example, via pipelines. However, the transport of natural gas via pipelines in remote areas or over very long distances is very expensive. In addition, it is sometimes impossible to lay such a pipeline through some countries because of the political situation there. In such cases, transport by sea in liquefied natural gas carriers (LNG carriers) is frequently chosen as an alternative. For this purpose, the natural gas is liquefied on land and fed into giant tanks onboard ships. Since natural gas can be liquefied only at very low temperatures of about −160° C. and also has to be stored and transported at these temperatures, it is necessary to insulate the tanks, especially onboard ships, as well as possible in order to keep the loss of liquefied gas by evaporation low.

Insulation materials used are primarily rigid polyurethane foams because of their excellent insulation properties compared to other insulation materials such as polystyrene foam or mineral wool.

The overall insulation construction in natural gas carriers is extremely complex. Thus, the insulation of the tanks not only has to prevent evaporation of natural gas but also has to offer the tanks a certain degree of stability. Thus, for example, layers of plywood, fiberglass and stainless steel are used in addition to rigid polyurethane foam for stabilizing the tanks.

The actual tanks comprise mainly a very thin barrier layer of stainless steel, so that the insulation structure provides a major part of the necessary stability. Thus, the rigid polyurethane foam which is usually used has a quite high density. Furthermore, it preferably comprises reinforcing material, usually fiberglass mats (CSMs—continuous strand mats), by means of which the necessary mechanical properties are obtained. For the optimal stability to be able to be ensured, uniform distribution of these fiberglass mats over the total thickness of the foam is an important parameter.

Such insulation constructions are described, for example, in the Korean patent documents KR 2000010021 and KR 2000010022, the Japanese patent documents JP 2003240198 and JP 2001150558, the US patent documents US 20050115248, U.S. Pat. No. 3,319,431 and U.S. Pat. No. 3,341,050 and the European application EP 1698649.

The production of the rigid polyurethane foam insulation elements is usually carried out continuously on a conveyor belt. Here, the drums comprising the fiberglass mats required for reinforcement are placed at the beginning of the belt and the fiberglass mats are rolled off continuously onto the belt. The polyurethane reaction mixture is fed onto these fiberglass mats. The reacting polyurethane reaction mixture has to penetrate into the fiberglass mats before the foam begins to rise as a result of the blowing reaction.

To ensure good and rapid processability, penetration of the reaction mixture into the fiberglass mats has to occur as quickly as possible. This has the advantage that the reaction mixture can become uniformly distributed between the fiberglass mats, which promotes uniform distribution of the fiberglass mats in the finished rigid polyurethane foam.

Furthermore, the foam has to foam very slowly and uniformly in order to further promote uniform distribution of the fiberglass mats in the rigid polyurethane foam.

As blowing agents, use is usually made of halogenated blowing agents such as chlorofluorocarbons and fluorocarbons since these give foams having a particularly low thermal conductivity. However, chlorofluorocarbons are responsible for degradation of the ozone layer and both chlorofluorocarbons and fluorocarbons are gases which contribute to global warming. For this reason, alternatives have to be sought.

Blowing agents such as hydrocarbons (for example pentane) are not particularly suitable because of their flammability.

EP 1698649 discloses, in examples 4 and 5, the production of polyurethane foam which is suitable for insulating liquefied natural gas tanks on board tankers, with water being used as blowing agent. A mixture comprising 60% by weight of a sorbitol-based polyetherol having a viscosity at from 20 to 30° C. of from 3000 to 5000 mPas, 20% by weight of a glycerol-based polyetherol having a viscosity at from 20 to 30° C. of from 200 to 400 mPas and 20% by weight of a bifunctional polyester polyol having a viscosity of from 4000 to 6000 mPas is used as polyol component. A mixture of a tin-based catalyst and potassium octoate is used as catalyst. Disadvantages of a formulation according to EP 1698649 are a relatively high thermal conductivity and a fast cream time of the reaction mixture at the same fiber time, which makes uniform distribution of the fiberglass mats difficult.

It was therefore an object of the invention to provide a rigid polyurethane foam which is suitable for the insulation of liquefied natural gas tanks onboard tankers, with the chlorofluorocarbons or fluorocarbons used as blowing agents being entirely or partly replaced by alternative blowing agents. A further object of the present invention was to provide a rigid polyurethane foam of this type which has good mechanical properties such as high compressive strength, high Young's modulus and a high shear strength, a uniform distribution of the reinforcing materials comprised, a good foam quality and a low thermal conductivity.

The object of the invention is achieved by a rigid polyurethane foam comprising reinforcing materials which can be obtained by mixing (a) isocyanates which have a viscosity at 25° C. of less than 500 mPas with (b) compounds having groups which are reactive toward isocyanates, (c) blowing agents comprising water, (d) catalysts and, if appropriate, (e) further additives, applying the reaction mixture to the reinforcing material and curing the reaction mixture, wherein the compounds (b) having groups which are reactive toward isocyanates comprise a polyetherol (b1) having a functionality of 4 or more and a viscosity at 25° C. of 10 000 mPas or less and a polyetherol (b2) having a functionality of 3 or less and a viscosity at 25° C. of 500 mPas or less.

As isocyanates (a), it is possible to use all customary aliphatic, cycloaliphatic and preferably aromatic diisocyanates and/or polyisocyanates which have a viscosity of less than 500 mPas, preferably less than 350 mPas, measured at 25° C. Particularly preferred isocyanates are tolylene diisocyanate (TDI) and diphenylmethane diisocyanate (MDI) and in particular mixtures of diphenylmethane diisocyanate and polymeric diphenylmethane diisocyanate (PMDI). These particularly preferred isocyanates can be fully or partially modified by uretdione, carbamate, isocyanurate, carbodiimide, allophanate and preferably urethane groups.

Furthermore, prepolymers can be used as isocyanate component. These prepolymers are prepared from the above-described isocyanates and the polyethers or polyesters described below or both and have an NCO content of from 20 to 30% by weight, preferably from 22 to 28% by weight.

As compounds (b) having groups which are reactive toward isocyanates, it is possible to use all compounds which have at least two groups which are reactive toward isocyanates, e.g. OH—, SH—, NH— and CH-acid groups. It is usual to use polyetherols and/or polyesterols having from 2 to 8 hydrogen atoms which are reactive toward isocyanate. The OH number of these compounds is usually in the range from 30 to 850 mg KOH/g, preferably in the range from 80 to 600 mg KOH/g.

The polyetherols are prepared by known methods, for example by anionic polymerization of alkylene oxides with addition of at least one starter molecule which comprises from 2 to 8, preferably from 2 to 6, reactive hydrogen atoms in bound form in the presence of catalysts. As catalysts, it is possible to use alkali metal hydroxides such as sodium or potassium hydroxide or alkali metal alkoxides such as sodium methoxide, sodium or potassium ethoxide or potassium isopropoxide, or in the case of cationic polymerization Lewis acids, such as antimony pentachloride, boron trifluoride etherate or bleaching earth. Furthermore, double metal cyanide compounds, known as DMC catalysts, can also be used as catalysts.

As alkylene oxides, preference is given to using one or more compounds having from 2 to 4 carbon atoms in the alkylene radical, e.g. tetrahydrofuran, 1,3-propylene oxide, 1,2- or 2,3-butylene oxide, in each case either alone or in the form of mixtures, and preferably ethylene oxide and/or 1,2-propylene oxide.

Possible starter molecules are, for example, ethylene glycol, diethylene glycol, glycerol, trimethylolpropane, pentaerythritol, sugar derivatives such as sucrose, hexitol derivatives such as sorbitol, methylamine, ethylamine, isopropylamine, butylamine, benzylamine, aniline, toluidine, toluenediamine, naphthylamine, ethylenediamine, diethylenetriamine, 4,4'-methylenedianiline, 1,3-propanediamine, 1,6-hexanediamine, ethanolamine, diethanolamine, triethanolamine and also other dihydric or polyhydric alcohols or monofunctional or polyfunctional amines.

The polyester alcohols used are usually prepared by condensation of polyfunctional alcohols having from 2 to 12 carbon atoms, e.g. ethylene glycol, diethylene glycol, butanediol, trimethylolpropane, glycerol or pentaerythritol, with polyfunctional carboxylic acids having from 2 to 12 carbon atoms, for example succinic acid, glutaric acid, adipic acid, suberic acid, azelaic acid, sebacic acid, decanedicarboxylic acid, maleic acid, fumaric acid, phthalic acid, isophthalic acid, terephthalic acid and the isomers of naphthalenedicarboxylic acids or their anhydrides.

As further starting materials in the preparation of the polyesters, it is possible to make concomitant use of hydrophobic substances. The hydrophobic substances are water-insoluble substances which comprise a nonpolar organic radical and also have at least one reactive group selected from among hydroxyl, carboxylic acid, carboxylic ester or mixtures thereof. The equivalent weight of the hydrophobic materials is preferably from 130 to 1000 g/mol. It is possible to use, for example, fatty acids such as stearic acid, oleic acid, palmitic acid, lauric acid or linoleic acid and also fats and oils such as castor oil, corn oil, sunflower oil, soybean oil, coconut oil, olive oil or tall oil. If polyesters comprise hydrophobic substances, the proportion of the hydrophobic substance preferably makes up from 1 to 30 mol %, particularly preferably from 4 to 15 mol %, of the total monomer content of the polyester alcohol.

The polyesterols used preferably have a functionality of from 1.5 to 5, particularly preferably 1.8-3.5 and in particular from 1.9 to 2.2.

Furthermore, chain extenders and/or crosslinkers can be used as compound (b) having groups which are reactive toward isocyanates. Chain extenders and/or crosslinkers used are, in particular, bifunctional or trifunctional amines and alcohols, in particular diols, triols or both, in each case having molecular weights of less than 400, preferably from 60 to 300.

Here, the compounds (b) having groups which are reactive toward isocyanates comprise a polyetherol (b1) having a functionality of 4 or more and a viscosity at 25° C. of 10 000 mPas or less and a polyetherol (b2) having a functionality of 3 or less and a viscosity at 25° C. of 500 mPas or less, preferably 300 mPas or less. The polyetherol b2) particularly preferably has a functionality of less than 2.5 and is, in particular, prepared from bifunctional starter molecules. The proportion of the polyetherol (b1) is preferably from 30 to 80% by weight, particularly preferably from 40 to 70% by weight, based on the total weight of the components (b1) and (b2).

In a further embodiment, the compounds (b) having groups with are reactive toward isocyanates comprise not only the polyetherol (b1) and the polyetherol (b2) but also a polyesterol (b3) having a viscosity at 25° C. of 2000 mPas or less.

The proportion of the polyetherols (b1), (b2) and, if present, (b3) in the compound (b) having groups which are reactive toward isocyanates is preferably at least 80% by weight, particularly preferably at least 90% by weight and in particular 100% by weight, based on the total weight of the compound (b) having groups which are reactive toward isocyanates.

As blowing agent (c), use is made of a blowing agent comprising water. Here, water can be used either alone or in combination with further blowing agents. The content of water in the blowing agent (c) is preferably greater than 40% by weight, particularly preferably greater than 60% by weight and very particularly preferably greater than 80% by weight, based on the total weight of the blowing agent (c). In particular, water is used as sole blowing agent. If further blowing agents are used in addition to water, it is possible to use, for example, chlorofluorocarbons, fluorocarbons, hydrocarbons, acids and liquid or dissolved carbon dioxide. Blowing agents (c) preferably comprise less than 50% by weight, more preferably less than 20% by weight, particularly preferably less than 10% by weight and in particular 0% by weight, based on the total weight of the blowing agent (c), of chlorofluorocarbons, fluorocarbons and/or hydrocarbons. In a further embodiment, a mixture of water and formic acid and/or carbon dioxide can be used as blowing agent (c). To be able to disperse the blowing agent more readily in the polyol component, the blowing agent (c) can be mixed with polar compounds such as dipropylene glycol.

The blowing agents (c) are used in such amounts that the density of the rigid polyurethane foam formed by reaction of the components (a) to (e) is, without taking the reinforcing material into account, in the range 50-200 g/l, preferably 80-120 g/l.

As catalysts (d), use is made of a mixture comprising at least one tertiary amine which accelerates the isocyanate-water reaction or the isocyanate-polyol reaction. Such catalysts are described, for example, in "Kunststoffhandbuch, volume 7, Polyurethane", Carl Hanser Verlag, 3rd edition 1993, chapter 3.4.1. These tertiary amines are usually compounds which can also bear groups which are reactive toward isocyanate, e.g. OH, NH or $NH_2$ groups. Some of the most frequently used catalysts are bis(2-dimethyl-aminoethyl) ether, N,N,N,N,N-pentamethyldiethylenetriamine, N,N,N-triethylamino-ethoxyethanol, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, trisdimethylaminopropylhexahydrotriazine, dimethylaminopropylamine, N-ethylmorpholine, diazabicycloundecene and diazabicyclononene. Preference is given to using mixtures comprising at least two different tertiary amines as catalysts (d). The catalyst mixture (d) particularly preferably comprises dimethylcyclohexylamine (d1) and a bicyclic amine (d2) or dimethylcyclohexylamine (d1) and a monocyclic amine (d3). Here, the ratio of dimethylcyclohexylamine (d1) and bicyclic amine (d2) or dimethylcyclohexylamine (d1) and monocyclic amine (d3) is preferably 0.2-4:1, particularly preferably 0.5-1.5:1. The cyclic amines d2) and d3) are preferably selected from among the cyclic amines mentioned above.

Furthermore, the catalyst mixture (d) can comprise further compounds which accelerate the isocyanate-water reaction or the isocyanate-polyol reaction. These are, for example, catalysts based on organic metal compounds such as organic tin compounds, for example tin(II) salts or organic carboxylic acids, e.g. tin(II) acetate, tin(II) octoate, tin(II) ethylhexoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates such as bismuth(III) neodecanoate, bismuth 2-ethylhexanoate and bismuth octanoate or alkali metal salts of carboxylic acids, e.g. potassium acetate or potassium formate.

The proportion of dimethylcyclohexylamine (d1), bicyclic amine (d2) and monocyclic amine (d3) in the catalyst mixture (d) is preferably at least 80% by weight, particularly preferably at least 90% by weight and in particular 100% by weight, based on the total weight of the catalysts (d).

As reinforcing materials, it is possible to use all materials which give the rigid polyurethane foam an even higher mechanical stability. Such reinforcing materials are, for example, glass fibers, fiberglass mats or carbon fiber mats, preferably fiberglass mats, for example Unifilio® U801 from Saint Gobain Vetrotex.

As further additives (e), it is possible to use foam stabilizers, flame retardants, further fillers and other additives such as antioxidants.

Foam stabilizers are substances which promote the formation of a regular cell structure during foaming. Examples which may be mentioned are: silicone-comprising foam stabilizers such as siloxane-oxalkylene copolymers and other organopolysiloxanes, also alkoxylation products of fatty alcohols, oxo alcohols, fatty amines, alkylphenols, dialkylphenols, alkylcresols, alkylresorcinol, naphthol, alkylnaphthol, naphthylamine, aniline, alkylaniline, toluidine, bisphenol A, alkylated bisphenol A, polyvinyl alcohol and also alkoxylation products of condensation products of formaldehyde and alkylphenols, formaldehyde and dialkylphenols, formaldehyde and alkylcresols, formaldehyde and alkylresorcinol, formaldehyde and aniline, formaldehyde and toluidine, formaldehyde and naphthol, formaldehyde and alkylnaphthol and also formaldehyde and bisphenol A or mixtures of two or more of these foam stabilizers.

Foam stabilizers are preferably used in an amount of from 0.5 to 4% by weight, particularly preferably from 1 to 3% by weight, based on the total weight of the components (b) to (e).

As flame retardants, it is generally possible to use the flame retardants known from the prior art. Suitable flame retardants are, for example, brominated ethers (Ixol B 251), brominated alcohols such as dibromoneopentyl alcohol, tribromoneopentyl alcohol and PHT-4-diol and also chlorinated phosphates such as tris(2-chloroethyl)phosphate, tris(2-chloroisopropyl) phosphate (TCPP), tris(1,3-dichloroisopropyl)phosphate, tris(2,3-dibromopropyl)phosphate and tetrakis(2-chloroethyl)ethylenediphosphate or mixtures thereof.

Apart from the abovementioned halogen-substituted phosphates, it is also possible to use inorganic flame retardants such as red phosphorus, preparations comprising red phosphorus, expandable graphite, hydrated aluminum oxide, antimony trioxide, arsenic oxide, ammonium polyphosphate and calcium sulfate or cyanuric acid derivatives such as melamine or mixtures of at least two flame retardants such as ammonium polyphosphates and melamine and also, if appropriate, starch for making the rigid polyurethane foams produced according to the invention flame resistant.

As further liquid halogen-free flame retardants, it is possible to use diethyl ethanephosphonate (DEEP), triethyl phosphate (TEP), dimethyl propylphosphonate (DMPP), diphenyl cresyl phosphate (DPC) and others.

For the purposes of the present invention, the flame retardants are preferably used in an amount of from 0 to 60% by weight, particularly preferably from 5 to 50% by weight, in particular from 5 to 40% by weight, based on the total weight of the components (b) to (e).

For the purposes of the present invention, further fillers, in particular reinforcing fillers, are the customary organic and inorganic fillers, reinforcing materials, etc., known per se. Specific examples are: inorganic fillers such as siliceous minerals, for example sheet silicates such as antigorite, serpentin, hornblendes, amphibols, chrysotile, talc; metal oxides such as kaolin, aluminum oxides, titanium oxides and iron oxides, metal salts such as chalk, barite and inorganic pigments such as cadmium sulfide, zinc sulfide and also glass and others. Preference is given to using kaolin (China Clay), aluminum silicate and coprecipitates of barium sulfate and aluminum silicate and also natural and synthetic fibrous materials such as wollastonite, metal fibers and in particular glass fibers of various lengths which may, if appropriate, be coated with a size. Hollow glass microspheres can also be used. Possible organic fillers are, for example: carbon, melamine, rosin, cyclopentadienyl resins and graft polymers and also cellulose fibers, polyamide fibers, polyacrylonitrile fibers, polyurethane fibers, polyester fibers based on aromatic and/or aliphatic dicarboxylic esters and in particular carbon fibers.

The inorganic and organic fillers can be used individually or as mixtures and are advantageously incorporated into the reaction mixture in amounts of from 0.5 to 30% by weight, preferably from 1 to 15% by weight, based on the weight of the components (a) to (e).

The invention further provides a process for producing rigid polyurethane foams, which comprises mixing (a) isocyanates with (b) compounds having groups which are reactive toward isocyanates, (c) blowing agents comprising water, (d) catalysts and, if appropriate, (e) further additives to form a reaction mixture, applying the reaction mixture to reinforcing material and curing it to give the polyurethane foam, wherein the isocyanates (a) have a viscosity at 25° C. of less than 500 mPas, the compounds (b) having groups which are reactive toward isocyanates comprise a polyetherol (b1) having a functionality of 4 or more and a viscosity at 25° C. of 10 000 mPas or less and a polyetherol (b2) having a functionality of 3 or less and a viscosity at 25° C. of 500 mPas or less.

The rigid polyurethane foam of the invention is preferably produced continuously on a belt. For this purpose, the components (b) to (d) and, if appropriate, (e) are mixed to form a polyol component. This is subsequently mixed with the isocyanate component (a), preferably in a low-pressure mixing device, a high-pressure mixing device at a reduced pressure of less than 100 bar or a high-pressure machine. As an alternative, the components (a) to (d) and, if appropriate, (e) can each be introduced individually into the mixing device. The reaction mixture obtained in this way is subsequently fed onto the reinforcing material, preferably the fiberglass mats which are preferably continuously rolled off from a plurality of drums (for example 5-10, preferably 6 or 7) onto the belt and there form an appropriate number of layers. The foam obtained is subsequently preferably cured on the belt to such an extent that it can be cut into pieces without damage. This can be carried out at elevated temperatures, for example during passage through an oven. The foam pieces obtained are then preferably stored for a further time in order to obtain the full mechanical strength.

The rigid polyurethane foam obtained is subsequently processed further to produce the insulation panel. For this purpose, the pieces of the rigid polyurethane foam of the invention are cut to size and preferably adhesively bonded to plywood sheets and resin-impregnated fiberglass mats. These polyurethane foam elements are then provided with further accoutrements such as iron plates, screws and threads in order to produce the finished insulation elements which are then used directly in the production of the insulation barrier of the liquefied natural gas tank. A detailed description of the production of such insulation panels may be found, for example, on the home page of the companies Finetec and Kangrim (Korea).

Isocyanates (a) and compounds (b) having groups which are reactive toward isocyanate, blowing agents comprising water (c), catalysts (d) and, if appropriate, further additives (e) are preferably reacted in such amounts that the isocyanate index is in the range from 100 to 400, preferably 100-180, particularly preferably 110-160.

For the purposes of the present invention, the isocyanate index is the stoichiometric ratio of isocyanate groups to groups which are reactive toward isocyanate multiplied by 100. Here, the expression "groups which are reactive toward isocyanate" refers to all groups which are reactive toward isocyanate and are comprised in the reaction mixture, including chemical blowing agents, but not the isocyanate group itself.

A particular advantage is that the reaction mixtures according to the invention penetrate quickly into the reinforcing materials and uniform distribution of the reinforcing materials in the resulting rigid polyurethane foam is promoted thereby. The long cream time of the reaction mixtures according to the invention combined with a short reaction time is likewise advantageous.

Rigid polyurethane foams according to the invention are preferably used for insulation purposes. Rigid polyurethane foams according to the invention are particularly preferably used for the insulation of liquefied natural gas tanks, in particular onboard ships (LNG carriers). These are mechanically stable, have a low thermal conductivity, display excellent foam properties, for example without holes and cracks, have good mechanical properties and have a uniform distribution of the layers of reinforcing materials.

The advantages of the invention are illustrated by the following examples.

EXAMPLES

To produce the rigid polyurethane foams according to the invention of Examples 1 to 5 and the Comparative Examples C1 to C4, the polyols used were stirred together as shown in Table 1 with catalysts, stabilizer and blowing agent and subsequently mixed with the isocyanate and foamed to give the rigid polyurethane foam. The fiber time was set in each case to 540 seconds by adapting the amount of catalyst. A constant foam density of 100 g/l was set by means of the blowing agent.

The composition of the reaction mixture for producing the rigid polyurethane foams of Examples 1 to 5 and the Comparative Examples C1 to C4 are shown in Table 1.

TABLE 1

| | Example | | | | | | | | |
|---|---|---|---|---|---|---|---|---|---|
| | 1 | 2 | 3 | 4 | 5 | C1 | C2 | C3 | C4 |
| Polyol 1 | | | | | | 60 | | | |
| Polyol 2 | 60 | 60 | 60 | 60 | | | 60 | 60 | |
| Polyol 3 | 38 | 38 | 38 | | | 38 | 38 | 38 | |
| Polyol 4 | | | | 38 | | | | | |
| Polyol 5 | | | | | 60 | | | | 60 |
| Polyol 6 | | | | | 20 | | | | 20 |
| Polyol 7 | | | | | 20 | | | | 20 |
| Isocyanate 1 | 140 | 140 | 140 | 140 | 150 | 140 | 140 | | 150 |
| Isocyanate 2 | | | | | | | | 140 | |
| Catalyst 1 | 0.1 | 0.1 | 0.1 | 0.1 | 0.1 | 0.1 | 0.2 | 0.1 | |
| Catalyst 2 | 0.1 | | | 0.1 | 0.1 | 0.1 | | 0.1 | |
| Catalyst 3 | | 0.1 | | | | | | | |
| Catalyst 4 | | | 0.1 | | | | | | |
| Catalyst 5 | | | | | | | | | 0.2 |
| Additive 1 | | | | | 10 | | | | 10 |

TABLE 1-continued

|  | Example | | | | | | | | |
|---|---|---|---|---|---|---|---|---|---|
|  | 1 | 2 | 3 | 4 | 5 | C1 | C2 | C3 | C4 |
| Stabilizer 1 | 2 | 2 | 2 | 2 | 1 | 2 | 2 | 2 | 1 |
| Blowing agent 1 | 1.7 | 1.7 | 1.7 | 1.7 | 1.5 | 1.7 | 1.7 | 1.7 | 1.5 |

The following starting materials were used here:
Polyol 1: sorbitol-based polyetherol, functionality=5, OH number=500 mg KOH/g, viscosity=22 000 mPas
Polyol 2: sugar-based, coinitiated polyetherol, functionality=4.4, OH number=500 mg KOH/g viscosity=8000 mPas
Polyol 3: propylene glycol-based polyetherol, functionality=2, OH number=100 mg KOH/g, viscosity=150 mPas
Polyol 4: glycerol-based polyetherol, functionality=3, OH number=400 mg KOH/g, viscosity=370 mPas
Polyol 5: sorbitol-based, coinitiated polyetherol, functionality=4.2, OH number=490 mg KOH/g, viscosity=5000 mPas
Polyol 6: glycerol-based polyetherol, functionality=3, OH number=250 mg KOH/g, viscosity=300 mPas
Polyol 7: phthalic anhydride-based polyesterol, functionality=2, OHN=240 mg KOH/g, viscosity=3000 mPas
(the viscosity figures are in each case based on the viscosity at 25° C.)
Isocyanate 1: polymeric methylenedi(phenyl isocyanate) (PMDI), viscosity=200 mPas (Lupranat M 20 S from BASF AG)
Isocyanate 2: polymeric methylenedi(phenyl isocyanate) (PMDI), viscosity=500 mPas (Lupranat M 50 from BASF AG)
(the viscosity figures are in each case based on the viscosity at 25° C.)
Catalyst 1 dimethylcyclohexylamine
Catalyst 2: bicyclic amine(diazabicycloundecene)
Catalyst 3: monocyclic amine(N-methylimidazole)
Catalyst 4: acyclic amine (N,N,N,N,N-pentamethyldiethylenetriamine)
Catalyst 5: mixture of dibutyltin dilaurate and potassium octoate
Additive 1: phosphorus-comprising flame retardant
Stabilizer 1: silicone-comprising foam stabilizer
Blowing agent 1: mixture comprising 60% of water and 40% of dipropylene glycol Rigid polyurethane foams having the dimensions 225 mm×225 mm×225 mm were produced in a mold. After curing, the test specimens for determining the thermal conductivity, the compressive strength and the Young's modulus in accordance with the standards indicated were sawn from this cube.

The thermal conductivity was determined in accordance with DIN 52612 at 23.4° C. one day after production of the rigid polyurethane foams. Compressive strength and the Young's modulus were measured perpendicular to the foaming direction (in x/y direction) in accordance with DIN 53421/DIN EN ISO 604.

The shear strength was determined perpendicular to the foaming direction (in x/y direction) in accordance with DIN 53427 at 25° C. and a pulling speed of 1 mm/minute on test specimens having dimensions of 170 mm×35 mm×17 mm.

The distribution of the fiberglass mats in the polyurethane foam bodies obtained were likewise determined on a cube having the abovementioned dimensions. The penetration time of the reaction mixture into the fiberglass mats was determined by placing 7 fiberglass mats (20×20 cm, Unifilio® U 801 from Saint Gobain Vetrotex, referred to as CSM) on the bottom of a mold and pouring the reaction mixture over them. The uppermost of the 7 fiberglass mats was for this purpose marked at 5 points. The penetration time reported was the time required for at least 4 of the 5 marked points to become visible again after application of the reaction mixture. After curing of this specimen, it was divided perpendicular to the fiberglass mats and the distances between the adjacent fiberglass mats were determined. The mean spacing of the fiberglass mats and also the standard deviation were calculated. The standard deviation should be very small in the case of a uniform distribution of the mats.

The foam quality was determined visually. In particular, an assessment was made as to whether the foam obtained has cracks or holes.

The determination of the cream time and the commencement of the temperature rise was carried out by means of a foam qualification system having an ultrasonic sensor for foam rise and a thermocouple. The foam and temperature rise is recorded as a function of time. The cream time is defined as the point in time at which 15% of the maximum speed of rise is reached.

The foam properties determined in this way are reported in Table 2.

TABLE 2

|  | Example | | | | | | | | |
|---|---|---|---|---|---|---|---|---|---|
|  | 1 | 2 | 3 | 4 | 5 | C1 | C2 | C3 | C4 |
| Density [g/l] | 100 | 100 | 100 | 100 | 100 | 100 | 100 | 100 | 100 |
| Compressive strength [N/mm$^2$] | 0.98 | 1.02 | — | — | 0.82 | 1.05 | — | 1.08 | 0.83 |
| Young's modulus [N/mm$^2$] | 28.8 | 28.4 | — | — | 24.5 | 27.8 | — | 28.7 | 22.7 |
| Thermal conductivity [mW/mK] | 27.3 | 27.3 | 27.3 | 27.4 | 29.3 | 27.5 | 27.4 | 27.8 | 30.6 |
| Shear strength [MPa] | 0.9 | 0.77 | 0.75 | 0.7 | 0.78 | 0.65 | 0.2 | 0.73 | 0.8 |
| Penetration time [s] | 64 | 82 | 100 | 120 | 120 | 150 | 105 | 215 | 126 |
| Mean spacing of the adjacent CSMs [mm] | 32.8 | 37 | 34.5 | 36 | 40 | 35 | 34 | 34.5 | 40.3 |

TABLE 2-continued

| | Example | | | | | | | | |
|---|---|---|---|---|---|---|---|---|---|
| | 1 | 2 | 3 | 4 | 5 | C1 | C2 | C3 | C4 |
| Standard deviation of the CSM layer spacing | 2.5 | 1.7 | 3.0 | 2.8 | 2.7 | 3.2 | 4.2 | 3.5 | 4.3 |
| Foam quality | ++ | ++ | + | + | + | − | − | − | + |
| Cream times [s] | | | | | 157 | | | | 145 |
| Commencement of temperature rise at [s] | | | | | 282 | | | | 230 |

It can be seen from the table that the rigid polyurethane foams according to the invention display a particularly high shear strength together with good or very good foam quality and a short penetration time. The standard deviation of the CSM layer spacing for the rigid polyurethane foams according to the invention is also lower than for foams of the comparative experiments. Comparison of examples 5 and C4 in particular shows a significant improvement in the thermal conductivity and the standard deviation of the CSM layer spacing and also an increase in the cream time and the time to commencement of the temperature rise when using amine catalyst instead of a catalyst system based on tin catalysts and potassium octoate.

The invention claimed is:

1. A rigid polyurethane foam comprising a reinforcing material homogeneously distributed therein, where the mean density of the polyurethane foam without reinforcing material is in the range 50-200 g/l, said rigid polyurethane foam comprising a reinforcing material homogeneously distributed therein being obtained by mixing
   a) isocyanates,
   b) compounds having groups which are reactive toward isocyanates,
   c) blowing agents comprising water,
   d) a catalyst mixture comprising tertiary amines and, optionally,
   e) further additives,
thereby forming a reaction mixture,
   applying the reaction mixture to a reinforcing material and curing the reaction mixture,
   wherein
   the isocyanates (a) have a viscosity of less than 500 mPas at 25° C.,
   the compounds (b) having groups which are reactive toward isocyanates comprise a polyetherol (b1) having a functionality of 4 or more and a viscosity at 25° C. of 10000 mPas or less and a polyetherol (b2) having a functionality of 3 or less and a viscosity at 25° C. of 500 mPas or less, and
   the reinforcing material is a fiberglass mat or a carbon fiber mat.

2. The rigid polyurethane foam according to claim 1, wherein the viscosity of the polyetherol (b2) at 25° C. is 300 mPas or less.

3. The rigid polyurethane foam according to claim 1, wherein the proportion of the polyetherol (b1) is from 30 to 80% by weight, based on the total weight of components (b1) and (b2).

4. The rigid polyurethane foam according to claim 1, wherein the polyetherol (b2) has been prepared exclusively from bifunctional starter molecules.

5. The rigid polyurethane foam according to claim 1, wherein the compounds (b) having groups which are reactive toward isocyanates additionally comprise (b3) a polyesterol having a viscosity at 25° C. of 2000 mPas or less.

6. The rigid polyurethane foam according to claim 1, wherein the proportion of the polyetherols (b1), (b2) and, optionally, (b3) in the compound (b) having groups which are reactive toward isocyanates is at least 80% by weight, based on the total weight of the compound (b) having groups which are reactive toward isocyanates.

7. The rigid polyurethane foam according to claim 6, wherein the proportion of the polyetherols (b1), (b2) and, optionally, (b3) in the compound (b) having groups which are reactive toward isocyanates is 100% by weight, based on the total weight of the compound (b) having groups which are reactive toward isocyanates.

8. The rigid polyurethane foam according to claim 1, wherein the catalyst mixture (d) comprises dimethylcyclohexylamine (d1) and a bicyclic amine (d2) or dimethylcyclohexylamine (d1) and a monocyclic amine (d3).

9. The rigid polyurethane foam according to claim 8, wherein the ratio of dimethylcyclohexylamine (d1) and the bicyclic amine (d2) or dimethylcyclohexylamine (d1) and the monocyclic amine (d3) is 0.2-4:1.

10. The rigid polyurethane foam according to claim 9, wherein the ratio of dimethylcyclohexylamine (d1) and the bicyclic amine (d2) or dimethylcyclohexylamine (d1) and the monocyclic amine (d3) is 0.5-1.5:1.

11. The rigid polyurethane foam according to claim 1, wherein the isocyanate (a) has a viscosity at 25° C. of less than 350 mPas.

12. The rigid polyurethane foam according to claim 1, wherein water is the sole blowing agent.

13. The rigid polyurethane foam according to claim 1, wherein the mean density of the polyurethane foam without reinforcing material is in the range 80-120 g/l.

14. The rigid polyurethane foam according to claim 1, wherein the reinforcing material is a fiber glass mat.

15. The rigid polyurethane foam according to claim 1, wherein the isocyanate index is in the range from 100 to 400.

16. A process for producing a rigid polyurethane foam comprising a reinforcing material homogeneously distributed therein, where the mean density of the polyurethane foam without reinforcing material is in the range 50-200 g/l, said process comprising mixing
   f) isocyanates,
   g) compounds having groups which are reactive toward isocyanates,
   h) blowing agents comprising water,
   i) a catalyst mixture comprising tertiary amines and, optionally,
   j) further additives,
to form a reaction mixture,
   applying the reaction mixture to a reinforcing material and curing the reaction mixture to give the polyurethane foam, wherein the isocyanates (a) have a viscosity of less than 500 mPas at 25° C., the compounds (b) having groups which are reactive toward isocyanates comprise a polyetherol (b1) having a functionality of 4 or more and a viscosity at 25° C. of 10000 mPas or less and a polyetherol (b2) having a functionality of 3 or less and a viscosity at 25° C. of 500 mPas or less, and the reinforcing material is a fiberglass mat or a carbon fiber mat.

17. The process according to claim 16, wherein the rigid foam comprising reinforcing material is produced continuously on a belt.

18. The process according to claim 17, wherein the reinforcing material is firstly fed continuously onto the belt and the reaction mixture is subsequently fed continuously onto the reinforcing material.

19. An insulation material for liquified natural gas tanks comprising a rigid polyurethane foam according to claim 1.

20. A rigid polyurethane foam comprising reinforcing material, where the mean density of the polyurethane foam without reinforcing material is in the range 50-200 g/l, said rigid polyurethane foam comprising a reinforcing material being obtained by mixing a) isocyanates,
b) compounds having groups which are reactive toward isocyanates,
c) blowing agents comprising water,
d) a catalyst mixture comprising tertiary amines, and, optionally,
e) further additives;

thereby forming a reaction mixture, applying the reaction mixture to a reinforcing material and curing the reaction mixture;

wherein the isocyanates a) have a viscosity of less than 500 mPas at 25° C.;

the compounds b) having groups which are reactive toward isocyanates comprise a polyetherol b1) having a functionality of 4 or more and a viscosity at 25° C. of 10000 mPas or less and a polyetherol b2) having a functionality of 3 or less and a viscosity at 25° C. of 500 mPas or less;

said rigid polyurethane foam has a shear strength of 0.7 to 0.9 MPa; and said reaction mixture has a penetration time into said reinforcing material of 64 to 120 seconds.

* * * * *